(12) United States Patent
Köffers et al.

(10) Patent No.: US 12,083,750 B2
(45) Date of Patent: Sep. 10, 2024

(54) METHOD AND DEVICE FOR PRODUCING A COMPONENT FROM A FIBER COMPOSITE MATERIAL

(71) Applicant: Siempelkamp Maschinen- und Anlagenbau GmbH, Krefeld (DE)

(72) Inventors: Fabian Köffers, Krefeld (DE); Michael Schöler, Rheurdt (DE); Klaus Schürmann, Jüchen (DE); Lothar Sebastian, Duisburg (DE)

(73) Assignee: Siempelkamp Maschinen-und Anlagenbau GmbH, Krefeld (DE)

( * ) Notice: Subject to any disclaimer, the term of this patent is extended or adjusted under 35 U.S.C. 154(b) by 279 days.

(21) Appl. No.: 17/636,641

(22) PCT Filed: Jul. 29, 2020

(86) PCT No.: PCT/EP2020/071408
§ 371 (c)(1),
(2) Date: Feb. 18, 2022

(87) PCT Pub. No.: WO2021/032430
PCT Pub. Date: Feb. 25, 2021

(65) Prior Publication Data
US 2022/0410503 A1 Dec. 29, 2022

(30) Foreign Application Priority Data
Aug. 22, 2019 (DE) ...................... 10 2019 005 917.4

(51) Int. Cl.
*B32B 41/00* (2006.01)
*B29C 70/34* (2006.01)
*B29C 70/54* (2006.01)
(52) U.S. Cl.
CPC ............ *B29C 70/342* (2013.01); *B29C 70/54* (2013.01); *B29K 2995/0097* (2013.01)

(58) Field of Classification Search
CPC ... B29C 70/342; B29C 70/54; B29C 35/0227; B29C 35/041; B29C 2035/043;
(Continued)

(56) References Cited

U.S. PATENT DOCUMENTS

| 9,050,757 B1 | 6/2015 | Boone et al. |
| 2006/0027314 A1 | 2/2006 | Jones et al. |

(Continued)

FOREIGN PATENT DOCUMENTS

| CN | 102821831 | 12/2012 |
| CN | 109703065 | 5/2019 |

(Continued)

OTHER PUBLICATIONS

German Search Report/Office Action conducted in counterpart German Appln. No. 10 2019 005 917.4 (Nov. 29, 2022).

(Continued)

*Primary Examiner* — Michael N Orlando
*Assistant Examiner* — Joshel Rivera
(74) *Attorney, Agent, or Firm* — GREENBLUM & BERNSTEIN, P.L.C.

(57) ABSTRACT

A method and a device for producing a component from a fiber composite material. The method includes introducing multiple layers of fibers impregnated with a matrix onto an inner mold, placing a membrane sealed against an outer mold onto the fibers impregnated with the matrix, such that a cavity extending along the shell surface of the outer mold forms between the outer mold and the membrane, and applying a temperature-controllable pressure fluid to the cavity at a temperature greater than the melting point of the matrix and at a pressure greater than the ambient pressure. To produce a component having at least one reinforcing layer, at least one reinforcing layer having fibers oriented in a predominantly parallel manner is placed locally onto a (Continued)

Figure 1A:
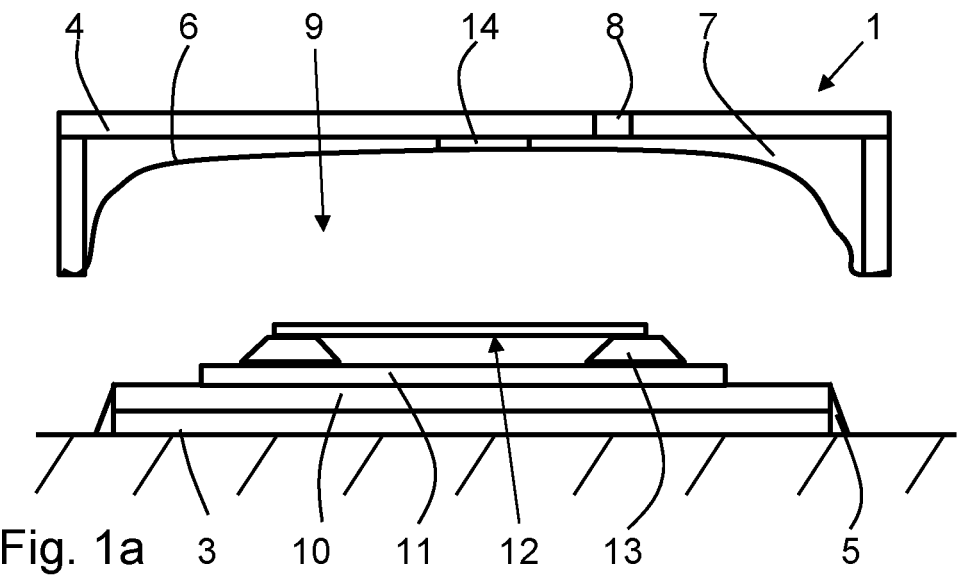

portion of a side of a the base layer facing the outer mold with the aid of an insertion device and a membrane with an average surface roughness of below 1.0 μm, preferably below 0.1 μm, subsequently exerts a set pressure in the cavity on the component.

20 Claims, 2 Drawing Sheets

(58) Field of Classification Search
CPC . B29C 70/44; B29C 33/04; B29K 2995/0097; Y02T 50/40; B30B 5/02
USPC .................... 156/60, 64, 350, 351, 378, 379
See application file for complete search history.

(56) References Cited

U.S. PATENT DOCUMENTS

| | | | |
|---|---|---|---|
| 2008/0203622 A1 | 8/2008 | Graham | |
| 2010/0181018 A1* | 7/2010 | Walczyk | B29C 70/44 |
| | | | 156/243 |
| 2014/0374012 A1 | 12/2014 | Bardenhagen | |
| 2020/0009766 A1* | 1/2020 | Uehara | B29C 43/20 |

FOREIGN PATENT DOCUMENTS

| | | | |
|---|---|---|---|
| DE | 10 2004 025 704 | 12/2005 | |
| DE | 10 2007 012 608 | 10/2008 | |
| DE | 10 2016 210 090 | 12/2017 | |
| DE | 10 2017 113 595 | 12/2018 | |
| EP | 2345528 | 7/2011 | |
| WO | WO-2010019697 A1 * | 2/2010 | .............. A42C 2/00 |
| WO | 2018/220337 | 12/2018 | |

OTHER PUBLICATIONS

Int'l Search Report (form PCT/ISA/210) conducted in Int'l Appln. No. PCT/EP2020/071408 (Oct. 22, 2020).
Int'l Written Opinion (form PCT/ISA/237) conducted in Int'l Appln. No. PCT/EP2020/071408 (Oct. 22, 2020).
"Rauheitsmaße bei Oberflächen von nichtrostendem Stahl, Merkblatt 984," ISER Publikation, Dec. 31, 2016, retrieved from Internet https://www.edelstahl-rostfrei.de/fileadmind/user_upload/ISER/downloads/MB_984_Ranheitsmasse.pdf, XP055739414, pp. 2-6.
Beyer, "Fertigungstechnik 1—Oberflächenvorbehandlung," Dresden Dec. 31, 2015, retrieved from Internet https://tu-dresden.de/ing/maschinenwesen/if/lot/resourcen/dateien/studium/lehrveransialmngen/download_vodesungen/ft1/dateien-2015_16-_17/y12_oberflaechem/orbehandlung?lang=de, XP055739451, pp. 28, 32, 45.
China Search Report/Office Action conducted in counterpart China Appln. No. 202080059377.8 (Nov. 4, 2023).
Junfen, *Thin Film Compound Solar Cells*, Beijing Institute of Technology Press, pp. 117-118 (Sep. 30, 2017).
Junsheng, *Display Device Technology*, National Defence Industry Press, p. 219 (Jul. 31, 2010).

* cited by examiner

METHOD AND DEVICE FOR PRODUCING A COMPONENT FROM A FIBER COMPOSITE MATERIAL

The invention relates to a method for producing a component from a fiber composite material, with the steps of:

introducing multiple layers of fibers impregnated with a matrix onto an inner mold within a mold space formed between the inner mold and an outer mold, placing a membrane sealed against the outer mold onto the fibers impregnated with the matrix, such that a cavity extending along the shell surface of the outer mold forms between the outer mold and the membrane, and applying a temperature-controllable pressure fluid to the cavity at a temperature greater than the melting point of the matrix and at a pressure greater than the ambient pressure, such that the temperature-controllable pressure fluid acts on the membrane with the pressure.

The invention also relates to a press arrangement for producing a component from a fiber composite material on an inner mold, having:

an outer mold which forms a mold space with the inner mold, a membrane which is sealed against the outer mold and forms a cavity with said outer mold, and a pressure connection for filling the cavity with temperature-controllable pressure fluid so that pressure and temperature can act on the membrane.

A method of this type and a press arrangement of this type are described in detail in DE 10 2017 113 595 A1. The invention results from an enhancement of this described method and this described press arrangement.

The membrane is preferably produced from a metal and separates the cavity within the mold space. Normally, it is most useful to use a thermal oil as temperature-controllable pressure fluid.

Organo sheets belonging to fiber composite materials are known from the prior art and are primarily used in aircraft and automobile construction, in order to obtain significantly lighter components compared to conventional materials, with comparable or even better rigidity. Organo sheets of this type normally comprise a fiber fabric or fiber scrim that is embedded in a matrix of thermoplastic material and are often present as fiber matrix semi-finished products with glass, aramid, or carbon as fiber material. The organo sheets result from consolidated prepreg layers, for example. Because prepregs can be hot-formed easily by means of known metalworking methods, shorter process times result compared to conventional thermosetting fiber composite materials.

In recent times, in the field of aircraft construction, fuselage sections with a semicircular cross section have been individually prefabricated from fiber composite material as a bottom shell and top shell, and have been combined into a finished aircraft fuselage in a subsequent final assembly. The fuselage sections are normally formed by means of an inner mold and an outer mold in a C frame press.

In the fabrication of large composite components by means of the method according to DE 10 2017 113 595 A1, it is ensured that a constant consolidation pressure acts on the aircraft fuselage halves on all sides. In addition, it can be ensured that the consolidation pressure, for example on the longitudinal edges of the semicircular aircraft fuselage halves, has a sufficiently large normal component, or a normal component that is even present at all, to the component.

In fabrication, however, it has been found that the transition to the thinner wall thickness regions from desired thicker wall thickness regions is noticeably shaped in steps. Not only is this unattractive; it also has, for example in aircraft, boat or automobile components, the characteristic of generating air or water turbulences on the surface.

Proceeding from this, an object of the present invention is to specify a method and a press arrangement by means of which a component can be produced from a fiber composite material, which component locally comprises, on the side facing the membrane in the production process, at least one reinforcing layer of fibers impregnated with a matrix, but nevertheless has a particularly smooth, stepless surface.

In terms of the method, the object of the invention is attained with the features of claim 1 and in particular in that at least one reinforcing layer, smaller in terms of expanse, having fibers oriented in a predominantly parallel manner is placed locally onto a portion of a side of a base layer facing the outer mold with the aid of an insertion device and a membrane with an average surface roughness of below 1.0 μm, preferably below 0.1 μm, subsequently exerts a set pressure in the cavity on the component. Advantageous embodiments are specified in the dependent claims.

In respect of the press arrangement, the object of the invention is attained with the features of claim 8 and in particular in that an insertion device is present for the successive placement of multiple layers of fibers impregnated with a matrix onto the inner mold and said device is suitable for locally placing at least one reinforcing layer, smaller in terms of expanse, onto a portion of a side of a base layer facing the outer mold, and in that the membrane with an average surface roughness of below 1.0 μm, preferably below 0.1 μm, is arranged and sealed such that a pressure in the cavitation presses the membrane onto the at least one reinforcing layer and the base layer.

The reinforcing layer is thus placed onto the base layer with an insertion device. The fibers can thereby be oriented such that they form a desired angle with the fibers of the base layer. The precision when adhering to the exact placement region of a reinforcing layer on the base layer is achieved with an insertion device. Reinforcing layers, for example in the form of prepregs, thereby normally have a thickness of 50 μm to 200 μm. The base layer, on the other hand, can also be formed by an organo sheet, for example.

Proceeding from the basic idea of using a temperature-controllable pressure fluid as a pressure and heating medium in the cavity between the outer mold and membrane, it is possible to achieve an equal consolidation pressure on the membrane on all sides, a targeted and uniform heating of the fiber impregnated with the matrix, and a rapid exchange of the temperature-controllable pressure fluid for cooling and preserving the component. In the pressing process, it was then surprisingly shown that a reinforcing layer having fibers oriented essentially parallel produces, by means of a membrane that is "as smooth as glass," properties of the component different than with membranes used previously. The average surface roughness of the membrane on the placement side should thereby be below 1.0 μm, preferably below 0.1 μm, and very preferably even below 0.05 μm. The steps clearly visible after the reinforcing layers were inserted before the pressing process completely disappeared after the pressing process with a membrane of this type. Instead, a completely smooth surface is produced, namely to such an extent that the transition from the base layer to the reinforcing layer is no longer perceptible. In combination with the extremely smooth membrane, this is because the pressing force acting on the membrane, and therefore on the fiber saturated in particular with a thermoplastic material matrix, due to the temperature-controllable pressure fluid acts, at every location of the membrane, in the direction of the normal of the membrane, and therefore likewise in the direction of the step of the inserted reinforcing layer, to the base layer. In this manner, each step is smoothed into a curved surface. It is assumed that the extensive parallelism of the fibers provides the freedom to also be able to press the reinforcing layer so strongly on the outer edge that an imperceptible transition to the base layer is made possible.

The same subject matter of the invention from the dependent claims applies to both the method and also to the press arrangement.

It is thus advantageous if the membrane has a thickness of 0.05 mm-0.5 mm.

With this thickness, a preferably martensitic stainless steel as a membrane possesses the desired elasticity and tensile strength. At the same time, the membrane can be secured on the outer mold by magnets when the reinforcing layers are being inserted, until the pressure is so great that the membrane detaches from the magnet and is pressed onto the reinforcing layer.

It is preferred if the at least one reinforcing layer comprises the same matrix material as the base layer.

The thermoplastic matrix material of the base layer and that of the reinforcing layer can then form a unit after the melting point is exceeded.

Preferably, multiple reinforcing layers having increasingly smaller area sizes in the direction of the outer mold are or have been layered.

And particularly preferably, the reinforcing layers having increasingly smaller area sizes in the direction of the outer mold do not protrude past the reinforcing layer located thereunder.

In this manner, multilayer thickenings of reinforcing layers can be produced on a base layer, which thickenings constitute a bulge with an extremely smooth surface.

It is advantageously provided that the fibers have a thickness between 1 and 20 μm.

Particularly in the lower region, the fiber is so thin that, with the aid of the melted, sloped matrix material, a step is no longer perceptible. Instead, each cross section through the component in the region of the reinforcement shows a parabolic profile of the surface as a smooth curve.

Preferably, the temperature of the temperature-controllable pressure fluid can be or is set to up to 400° C. and a pressure of over 35 bar can be or is set.

In principle, the inner mold and outer mold can have any desired shape. In the case of a press, the inner mold can constitute the lower die and the outer mold the upper die. Even more preferably, an inner mold and outer mold resting on one another close at the edges thereof in a pressure-tight and/or sealing manner and/or rest on one another such that their edges are in contact. In this context, the method preferably comprises the additional step of placing the outer mold onto the inner mold such that the outer mold and inner mold rest on one another at the edges thereof in a sealing manner in order to form the mold space and/or to fix in place and/or tension against one another the outer mold and inner mold resting on one another, in particular by means of the press.

While the method can in principal be carried out with any desired fibers impregnated with the matrix, the fibers are preferably embodied as glass fibers, aramid fibers, and/or carbon fibers. It is very particularly preferred if the fiber saturated with the thermoplastic material matrix is embodied as a fiber matrix semi-finished product, as a fiber composite material, and/or as an organo sheet, and/or as a prepreg. The fiber impregnated with the matrix is preferably embodied as a fiber saturated with a thermoplastic material matrix.

The invention is explained below in greater detail with reference to the appended drawings on the basis of a preferred exemplary embodiment.

IN THE DRAWINGS

Figure 1B:
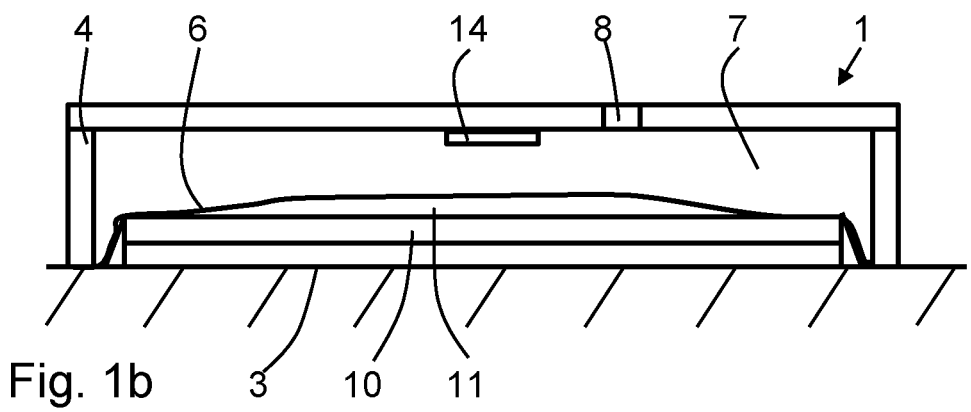
Figure 1C:
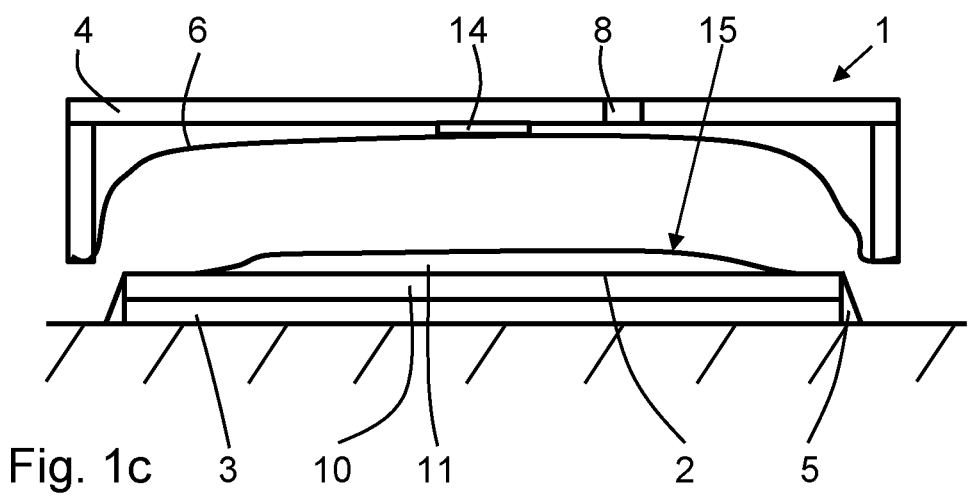
Figure 2:
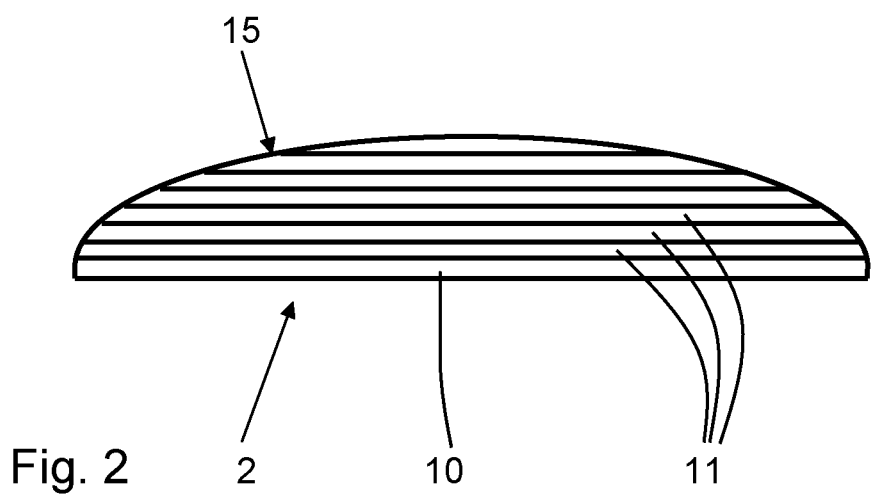

FIGS. 1a through 1c show a press arrangement for carrying out the method for producing a component from a fiber composite material according to the invention in a schematic perspective view in three method steps, and FIG. 2 shows a cross section of a component that can be formed from a fiber composite material.

FIG. 1a schematically shows a press arrangement for performing a method for producing a component from a base layer and a reinforcing layer of a fiber composite material, as well as an insertion device for the individual layers. In the first method step 1a illustrated of three, an inner mold or lower die 3 is visible with a press frame 5 for receiving the base layer 10. The raised upper portion is formed by the outer mold 4 or the upper die 4, which can be lowered onto the inner mold 3 in a manner not illustrated to produce a seal. Together, the inner mold 3 and outer mold 4 form the mold space 9 for producing the component 2. A metal membrane 6 is attached in a sealed manner all around the outer mold 4 so that a cavity 7 forms between the outer mold 4 and the metal membrane 6, into which cavity 7 temperature-controllable pressure fluid can be introduced via a pressure connection 8 at a pressure up to at least 30 bar, preferably even 40 bar, and at settable temperatures up to 400° ° C., for example. In the state illustrated in FIG. 1a, the pressure exerted by the temperature-controllable pressure fluid is still very low, so that the metal membrane 6 is held on the outer mold 4 by means of a magnet 14. In the illustrated raised state of the outer mold, the introduction of the base layer 10 and reinforcing layer(s) (11) by means of an insertion device 12 is possible. The movable and displaceable insertion device is indicated in FIG. 1a with two schematically illustrated suction devices 13 which can, for example, pick up a reinforcing layer 11 and set it down at its desired deposit location.

FIG. 1b shows the state in which the outer mold and inner mold have been moved together. The insertion device 12 has been removed from the mold space 9. The cavity 7 has been filled with a temperature-controllable pressure fluid, in this case thermal oil for example, under high pressure, so that the metal membrane has detached from the magnet and laid itself smoothly over the formerly step-like layering of the base layer 10 and reinforcing layer 11 on top of one another. The high temperatures and the high pressure cause the step to be "pressed smooth," so that a transition from the base layer 10 to the reinforcing layer 11 is no longer perceptible on the component surface 15. For this purpose, however, the reinforcing layer must comprise an essentially parallel fiber arrangement with fiber thicknesses between 1 and 20 μm, and the metal membrane must have a maximum average surface roughness of below 1.0 μm, preferably below 0.1 μm, very preferably even below 0.05 μm. The thermal oil serves as a pressure and heating medium, in order to exert, via the metal membrane 6, a constant consolidation pressure on all sides on the fiber saturated with the thermoplastic material matrix and to effect a targeted, uniform heating of the fiber saturated with the thermoplastic material matrix. The parallel fusing of the matrix of the base layer and the matrix of the reinforcing layer 11 and cooling under pressure then achieve the surprising smoothness on the component surface 15.

The state in FIG. 1c shows the lifting process of the outer mold after the pressure and the temperature were reduced in the cavity and the metal membrane 6 is already being attracted again by the magnet 14.

FIG. 2 shows a possible component of fiber component material 2 in cross section. Recognizable is the lower base layer 10, which was located in the press frame 5 of the inner mold 3 during the production process. Multiple reinforcing layers 11 were layered thereupon, the area sizes of which layers decrease in an upward direction and with which layers there is no protrusion of a reinforcing layer from the layer thereof which lies under said reinforcing layer. After the pressing with the aid of the smooth-as-glass metal membrane, the component surface is very smooth and displays a parabola shape in cross section.

| List of Reference Numerals |   |
|---|---|
| 1 | Device |
| 2 | Component of fiber composite material |
| 3 | Inner mold, lower die |
| 4 | Outer mold, upper die |
| 5 | Press frame |
| 6 | Membrane |
| 7 | Pressure compartment for temperature-controllable pressure fluid, cavity |
| 8 | Pressure connection |
| 9 | Mold space |
| 10 | Base layer |
| 11 | Reinforcing layer |
| 12 | Insertion device |
| 13 | Suction device |
| 14 | Magnet |
| 15 | Component surface |

The invention claimed is:

1. A method for producing a component from a fiber composite material comprising:
introducing multiple layers of fibers impregnated with a matrix, which include at least one reinforcing layer and at least one base layer, onto an inner mold within a mold space formed between the inner mold and an outer mold,
placing a membrane sealed against the outer mold onto the fibers impregnated with the matrix, such that a cavity extending along the shell surface of the outer mold forms between the outer mold and the membrane, and
applying a temperature-controllable pressure fluid to the cavity at a temperature greater than the melting point of the matrix and at a pressure greater than the ambient pressure, such that the temperature-controllable pressure fluid acts on the membrane with the pressure,
wherein the at least one reinforcing layer, which is smaller in terms of expanse than the base layer, having fibers oriented in a predominantly parallel manner is placed locally onto a portion of a side of the base layer facing the outer mold with the aid of an insertion device and the membrane, having an average surface roughness of below 1.0 µm, subsequently exerts a set pressure on the at least one reinforcing layer and the base layer to form the component.

2. The method according to claim 1, wherein the membrane has a thickness of 0.05 mm-0.5 mm.

3. The method according to claim 1, wherein the at least one reinforcing layer comprises the same matrix material as the base layer.

4. The method according to claim 1, wherein reinforcing layers having increasingly smaller area sizes in the direction of the outer mold are layered.

5. The method according to claim 4, wherein the reinforcing layers are layered such that the increasingly smaller area sizes in the direction of the outer mold do not protrude past the reinforcing layer located thereunder.

6. The method according to claim 1, wherein the fibers have a thickness between 1 and 20 µm.

7. The method according to claim 1, wherein the temperature of the temperature-controllable pressure fluid is set to up to 400° C. and a pressure of over 35 bar is set.

8. A press arrangement for producing a component from a fiber composite material on an inner mold, comprising:
an outer mold which forms a mold space with the inner mold, a membrane, which is sealed against the outer mold, and forms a cavity with said outer mold,
a pressure connection for filling the cavity with temperature-controllable pressure fluid so that pressure and temperature can act on the membrane, and
an insertion device for the successive placement of multiple layers of fibers impregnated with a matrix, which includes at least one reinforcing layer and a base layer, onto the inner mold to locally place the at least one reinforcing layer, which is smaller in terms of expanse than the base layer, onto a portion of a side of the base layer facing the outer mold,
wherein the membrane, having an average surface roughness of below 1.0 µm, is arranged and sealed to be pressable onto the at least one reinforcing layer and the base layer by the pressure applied to the cavity to form the component.

9. The press arrangement according to claim 8, wherein the membrane has a thickness of 0.05 mm-0.5 mm.

10. The press arrangement according to claim 8, wherein the at least one reinforcing layer comprises the same matrix material as the base layer.

11. The press arrangement according to claim 8, wherein reinforcing layers having increasingly smaller area sizes in the direction of the outer mold have been layered.

12. The press arrangement according to claim 11, wherein the reinforcing layers have been layered such that the increasingly smaller area sizes in the direction of the outer mold do not protrude past the reinforcing layer located thereunder.

13. The press arrangement according to claim 8, wherein the fibers have a thickness between 1 and 20 µm.

14. The press arrangement according to claim 8, wherein the temperature of the temperature-controllable pressure fluid can be set to up to 400° C. and a pressure of over 35 bar can be set.

15. The method according to claim 1, wherein the average roughness of the membrane is below 0.1 µm.

16. The method according to claim 1, wherein the at least one reinforcing layer placed locally on the base layer to form a step-like layering, and
wherein the membrane, when acted on by the temperature-controllable pressure fluid, is laid over the step-like layering to press smooth a step between the at least one reinforcing layer and the base layer.

17. The method according to claim 8, wherein the outer mold includes a magnet arranged to at least one of:
hold a portion of the metal membrane above the at least one reinforcing layer and base layer before the temperature-controllable pressure fluid is applied to the cavity, or lift a portion of the metal membrane from the formed component.

18. The press arrangement according to claim 8, wherein the average roughness of the membrane is below 0.1 μm.

19. The press arrangement according to claim 8, wherein the outer mold includes a magnet arranged to at least one of:
- hold a portion of the metal membrane above the at least one reinforcing layer and base layer before the temperature-controllable pressure fluid is applied to the cavity, or
- lift a portion of the metal membrane from the formed component.

20. The press arrangement according to claim 8, wherein the insertion device comprises at least one suction device to pick up and set down the at least one reinforcing layer.

* * * * *